United States Patent
Matsuyama

(10) Patent No.: US 9,995,827 B2
(45) Date of Patent: Jun. 12, 2018

(54) MOBILE VEHICLE

(71) Applicant: Sharp Kabushiki Kaisha, Osaka (JP)

(72) Inventor: Kazuhiro Matsuyama, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days. days.

(21) Appl. No.: 15/258,146

(22) Filed: Sep. 7, 2016

(65) Prior Publication Data

US 2017/0090033 A1 Mar. 30, 2017

(30) Foreign Application Priority Data

Sep. 25, 2015 (JP) .................. 2015-188274

(51) Int. Cl.
| | |
|---|---|
| *B60R 11/04* | (2006.01) |
| *G01S 17/93* | (2006.01) |
| *B60L 15/38* | (2006.01) |
| *B60W 40/02* | (2006.01) |
| *G01S 19/13* | (2010.01) |
| *G01S 17/42* | (2006.01) |
| *B60R 11/00* | (2006.01) |

(52) U.S. Cl.
CPC .......... *G01S 17/936* (2013.01); *B60L 15/38* (2013.01); *B60R 11/04* (2013.01); *B60W 40/02* (2013.01); *G01S 17/42* (2013.01); *G01S 19/13* (2013.01); *B60L 2200/40* (2013.01); *B60R 2011/0092* (2013.01); *Y02P 90/60* (2015.11)

(58) Field of Classification Search
CPC ......... G01S 17/00; G01S 17/936; B60L 15/00
See application file for complete search history.

(56) References Cited

U.S. PATENT DOCUMENTS

| | | | | |
|---|---|---|---|---|
| 5,884,718 A | * | 3/1999 | Yamashiro ........... | B62D 51/007 180/9.32 |
| 7,556,108 B2 | * | 7/2009 | Won ........................ | B25J 5/005 180/8.7 |
| 7,654,348 B2 | * | 2/2010 | Ohm ....................... | B25J 5/005 180/8.2 |
| 8,662,215 B1 | * | 3/2014 | Ohm ....................... | B25J 5/005 180/8.2 |
| 8,918,214 B2 | * | 12/2014 | Bosscher ................ | B25J 5/005 700/260 |

FOREIGN PATENT DOCUMENTS

JP  2005-111595 A  4/2005

* cited by examiner

*Primary Examiner* — John D Walters
*Assistant Examiner* — James J Triggs
(74) *Attorney, Agent, or Firm* — Renner, Otto, Boisselle & Sklar, LLP

(57) ABSTRACT

A mobile vehicle comprising: an electric undercarriage including a wheel that can travel; and a distance detection unit and a protruding structure which are mounted on the electric undercarriage, wherein the distance detection unit is configured to emit light horizontally in a range of a predetermined center angle around the electric undercarriage and to be capable of detecting a distance to an object present within the range of the predetermined center angle, the protruding structure includes one or more of an antenna, a warning light, an imaging device, and a lift mechanism unit, and the protruding structure is placed on the electric undercarriage at a position outside the range of the predetermined center angle, whose mobile vehicle can reliably recognize an obstacle without creating a blind spot in a traveling direction.

8 Claims, 6 Drawing Sheets

MOBILE VEHICLE

CROSS-REFERENCE TO RELATED APPLICATIONS

This application is related to Japanese Patent Application No. 2015-188274 filed on 25 Sep. 2015, whose priority is claimed under 35 USC § 119, and the disclosures of which is incorporated by reference in their entirety.

BACKGROUND OF THE INVENTION

1. Field of the Invention

The present invention relates to a mobile vehicle, and more particularly to a mobile vehicle including a distance detection unit that detects a distance to an obstacle.

2. Description of the Background Art

Recently, a mobile vehicle that autonomously moves, such as a transfer robot that transfers cargo or a surveillance robot that surveils a condition in a building, around a building, or in a predetermined site, has been used. In addition, an autonomous vehicle provided with a camera, various sensors, an arm, a boom, and the like may sometimes be used for searching sufferers in disaster areas struck by an earthquake, tsunami, a landslide, or the like or for activities of collecting information concerning the inside of a factory or a power plant where an accident has occurred in a dangerous area (for example, see Japanese Unexamined Patent Publication No. 2005-111595).

The conventional autonomous vehicle described above has to preliminarily store map information and moving route information where the vehicle should travel, and to safely travel on a predetermined route, while avoiding an obstacle, by utilizing information acquired from a camera, a distance detection device, and a GPS (Global Positioning System).

As a method for recognizing an obstacle around the autonomous vehicle, there is a method using LIDAR (Light Detection and Ranging, or Laser Imaging Detection and Ranging) in which laser is emitted to a two-dimensional space or a three-dimensional space in a predetermined distance measurement region to measure distances at a plurality of measured points in the distance measurement region.

However, when a part of the autonomous vehicle protrudes in a scanning range of the LIDAR, a blind spot is created in the range where obstacle recognition is needed. Therefore, reliable obstacle recognition may not be implemented.

SUMMARY OF THE INVENTION

The present invention is accomplished in view of the above problem, and an object of the present invention is to provide a mobile vehicle that can reliably recognize an obstacle without creating a blind spot in a traveling direction.

Accordingly, the present invention provides a mobile vehicle comprising: an electric undercarriage including a wheel that can travel; and a distance detection unit and a protruding structure which are mounted on the electric undercarriage, wherein the distance detection unit is configured to emit light horizontally in a range of a predetermined center angle around the electric undercarriage and to be capable of detecting a distance to an object present within the range of the predetermined center angle, the protruding structure includes one or more of an antenna, a warning light, an imaging device, and a lift mechanism unit, and the protruding structure is placed on the electric undercarriage at a position outside the range of the predetermined center angle.

According to the mobile vehicle in the present invention having the above configuration, the protruding structure such as the antenna, the warning light, the imaging device, and the lift mechanism unit is placed at the position outside the range of the predetermined center angle, which range is a scanning range of the distance detection unit. Thus, there is no protruding structure that hinders the scanning within the range of the predetermined center angle around the mobile vehicle, whereby the mobile vehicle can reliably recognize an obstacle.

DESCRIPTION OF THE PREFERRED EMBODIMENTS

Figure 1:
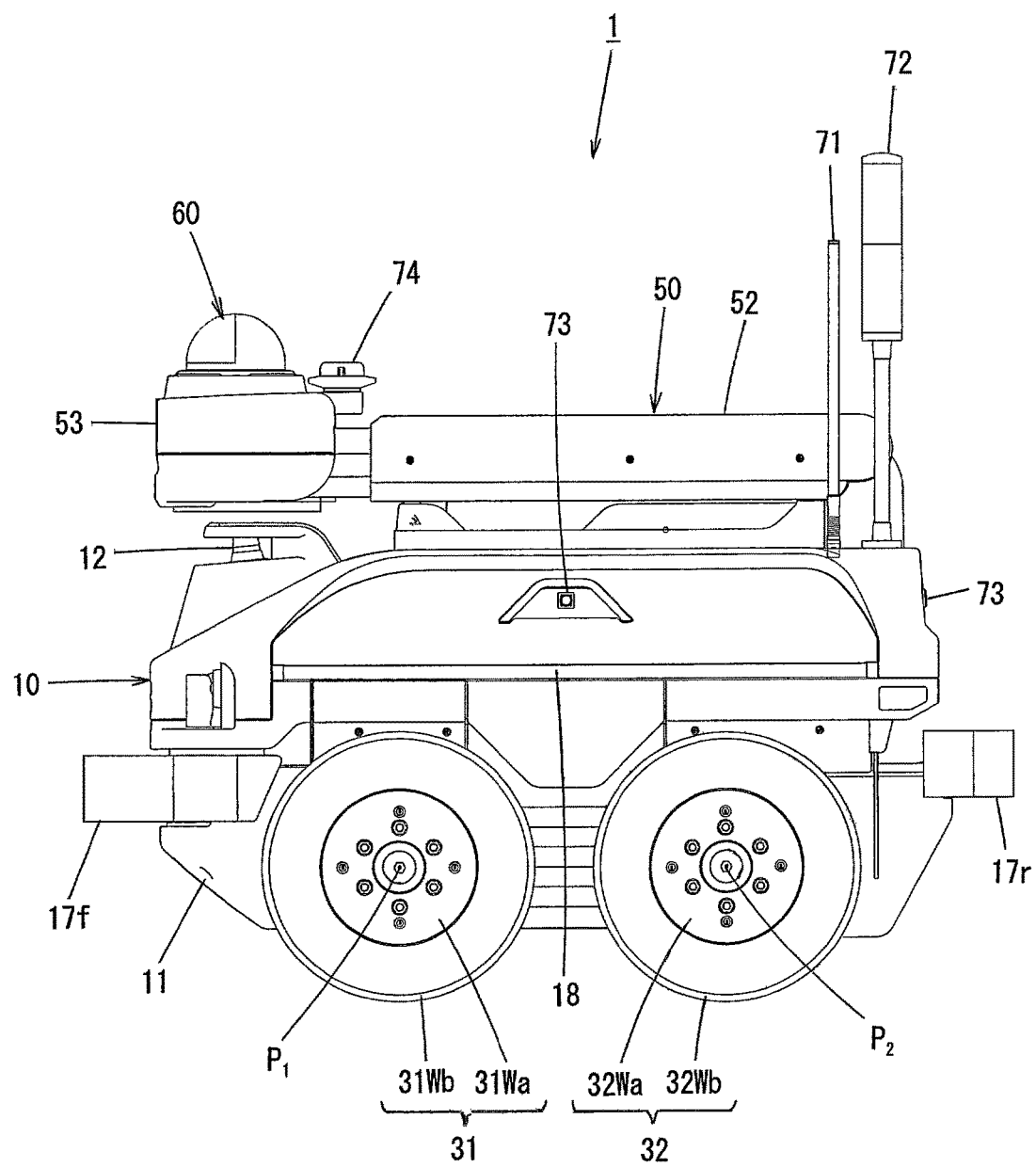
FIG. 1 is a left side view illustrating a first embodiment of a mobile vehicle according to the present invention.

A mobile vehicle according to the present invention comprises: an electric undercarriage including a wheel that can travel; and a distance detection unit and a protruding structure which are mounted on the electric undercarriage, wherein the distance detection unit is configured to emit light horizontally in a range of a predetermined center angle around the electric undercarriage and to be capable of detecting a distance to an object present within the range of the predetermined center angle, the protruding structure includes one or more of an antenna, a warning light, an imaging device, and a lift mechanism unit, and the protruding structure is placed on the electric undercarriage at a position outside the range of the predetermined center angle.

The mobile vehicle according to the present invention may be configured as described below, and these configurations may be combined as appropriate.

(1) The predetermined center angle may range from 180° to 330° from front to left and right sides of the electric undercarriage.

According to this configuration, an obstacle present in the traveling direction of the mobile vehicle, that is, in the direction of forward movement, in the direction of clockwise turning, and in the direction of counterclockwise turning, can reliably be detected by the distance detection unit. Thus, the vehicle can travel while avoiding the obstacle to prevent the collision against the obstacle.

(2) The distance detection unit may employ LIDAR that emits laser to at least a two-dimensional space in a predetermined distance measurement region to detect distances at a plurality of measured points within the range of the predetermined center angle.

According to this configuration, a distance can be measured with high precision using laser even in a dark space.

(3) The mobile vehicle may further comprise the antenna and the lift mechanism unit as the protruding structure, wherein the antenna may include a GPS antenna, the GPS antenna being mounted on the lift mechanism unit so as to be capable of being raised and lowered.

According to this configuration, a signal of current position information from a satellite can be received with high sensitivity by the GPS antenna that is raised by the lift mechanism unit.

(4) The mobile vehicle may further comprise the imaging device as the protruding structure, wherein the imaging device may include a surveillance camera, the surveillance camera being mounted on the lift mechanism unit so as to be capable of being raised and lowered.

According to this configuration, the surveillance camera raised by the lift mechanism unit can photograph and surveil a wide range around the vehicle from a high position.

(5) The mobile vehicle may further comprise the imaging device as the protruding structure, wherein the imaging device may include a small camera, the small camera being mounted at a rear end of the electric undercarriage.

According to this configuration, an obstacle at a rear can be recognized by the small camera by complementing an area outside the scanning range of the distance detection unit.

(6) The mobile vehicle may further comprise the antenna as the protruding structure, wherein the antenna may include a communication antenna.

According to this configuration, various information can be bi-directionally exchanged between the mobile vehicle and a management server through a network.

An embodiment of a mobile vehicle according to the present invention will be described below with reference to the drawings. In the embodiment described below, an autonomous mobile vehicle is described as one example. However, the mobile vehicle according to the present invention is not limited to an autonomous vehicle, and is applicable to a wired or wireless remotely-operated mobile vehicle or a manned mobile vehicle.

First Embodiment

Figure 2:
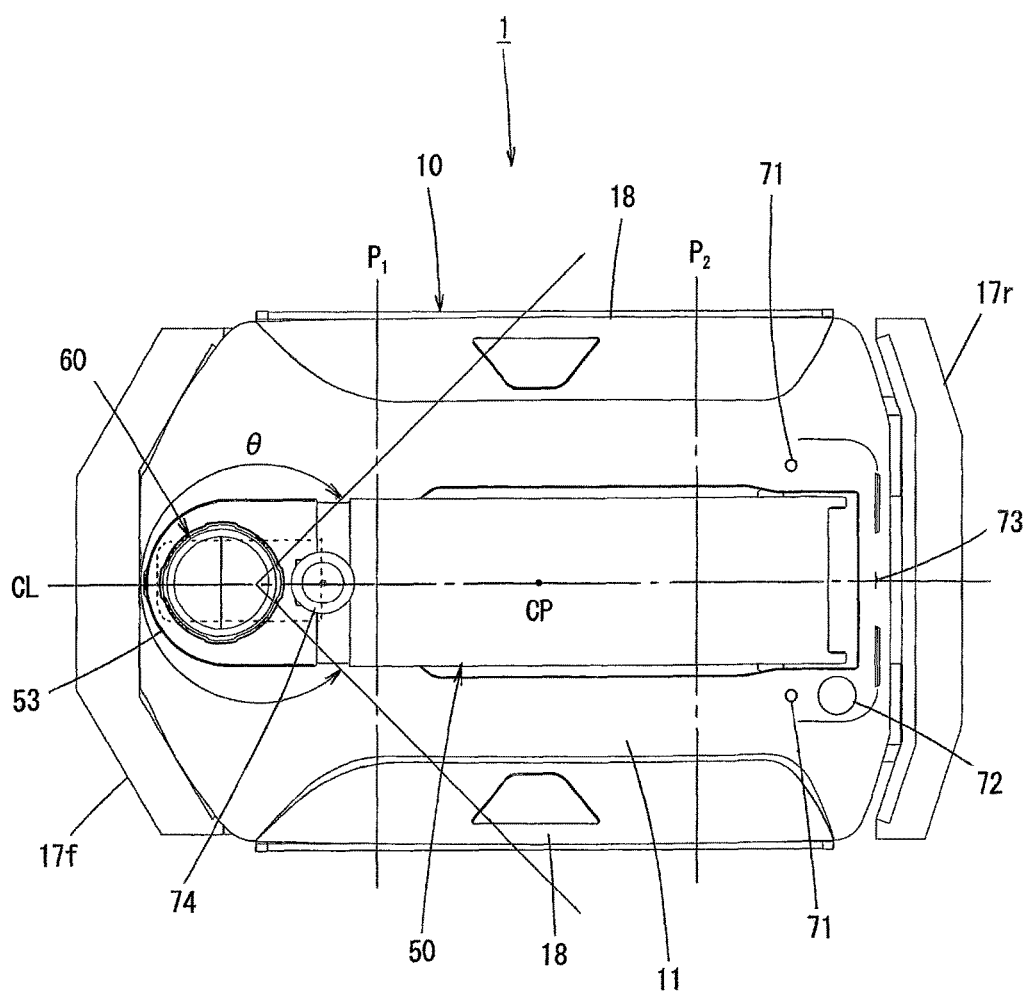
FIG. 2 is a plan view of the mobile vehicle illustrated in FIG. 1.
Figure 3A:
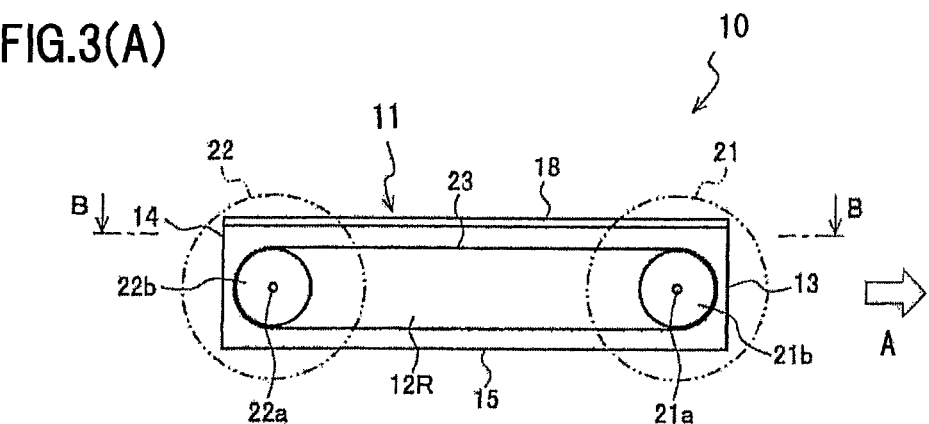
FIG. 3(A) is a right side view for describing a schematic configuration of an electric undercarriage of the mobile vehicle according to the first embodiment.
Figure 3B:
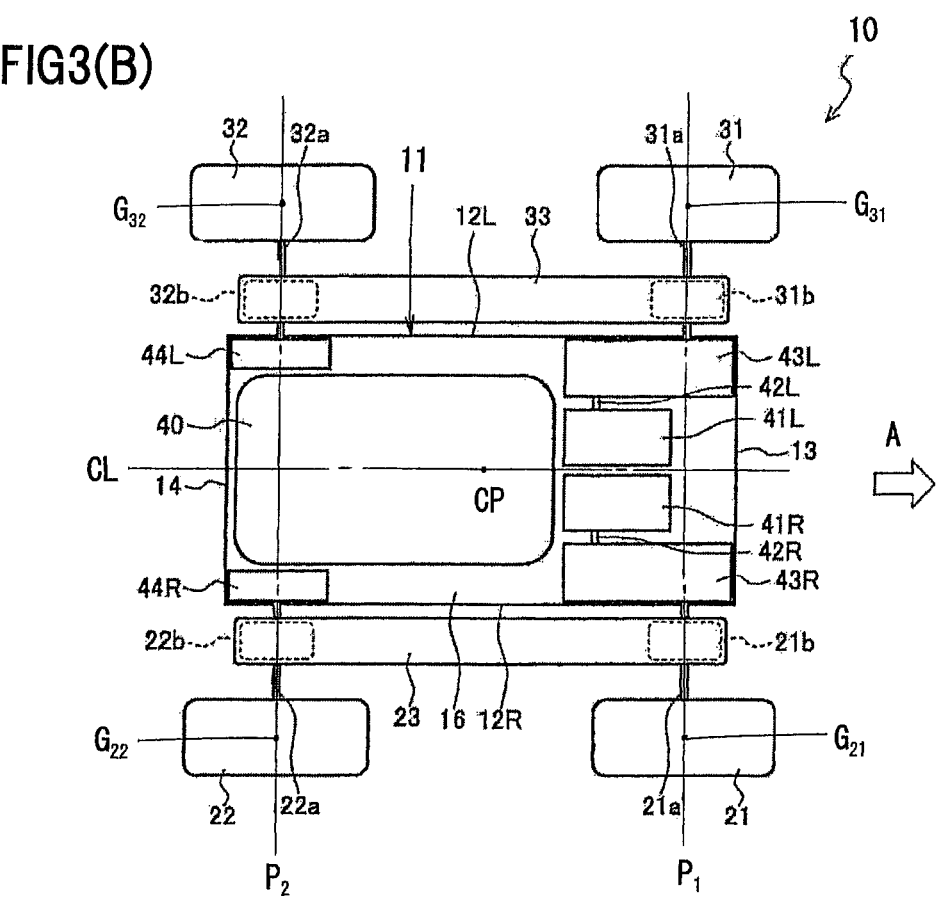
FIG. 3(B) is a sectional view viewed from an arrow along a line B-B in FIG. 3(A)
Figure 4:
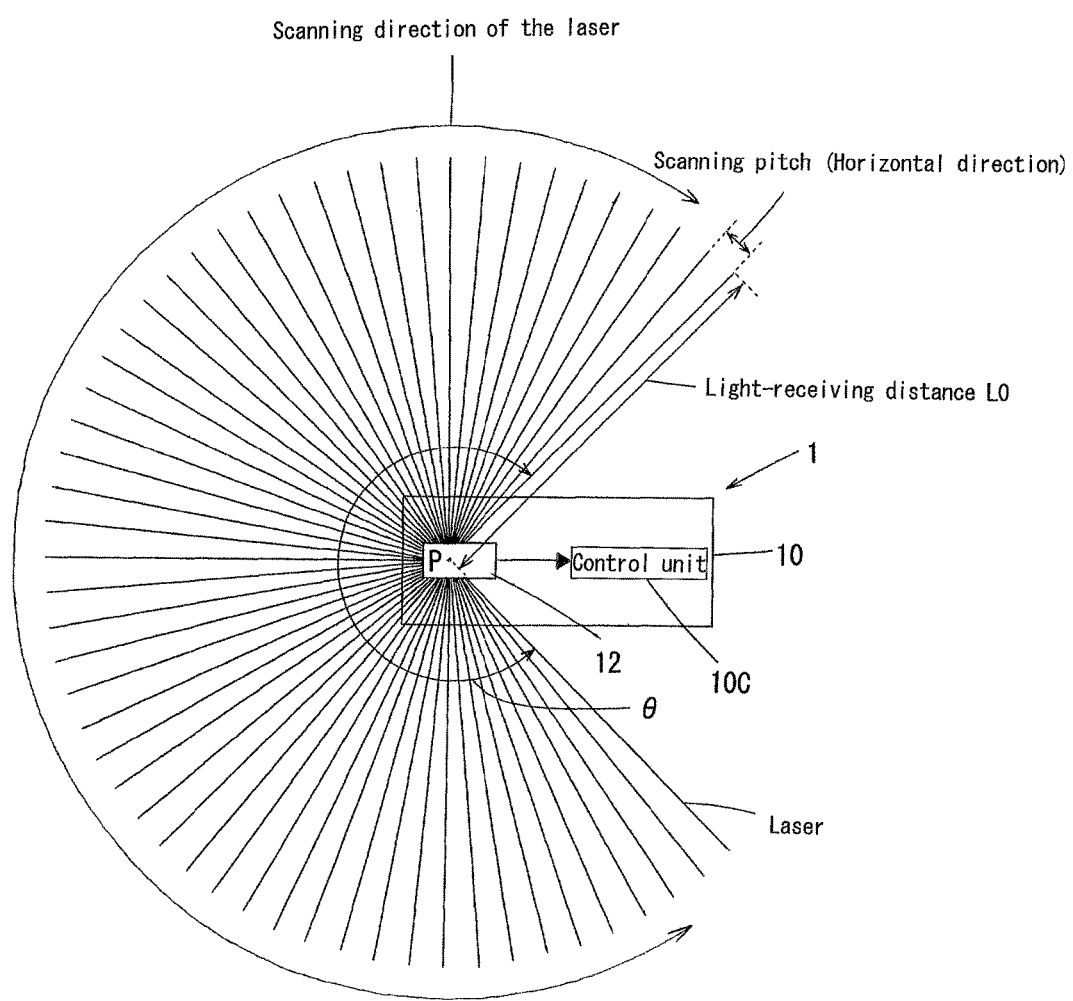
FIG. 4 is a schematic explanatory diagram when a laser irradiation region of a distance detection unit in the mobile vehicle according to the first embodiment is viewed from top.

FIG. 1 is a left side view illustrating a first embodiment of a mobile vehicle according to the present invention, and FIG. 2 is a plan view of the mobile vehicle illustrated in FIG. 1. FIG. 3(A) is a right side view for describing a schematic configuration of an electric undercarriage of the mobile vehicle according to the first embodiment, and FIG. 3(B) is a sectional view viewed from an arrow along a line B-B in FIG. 3(A). FIG. 4 is a schematic explanatory diagram when a laser irradiation region of a distance detection unit in the mobile vehicle according to the first embodiment is viewed from top.

The mobile vehicle 1 (hereinafter also referred to as a vehicle) according to the first embodiment mainly includes an electric undercarriage 10, a distance detection unit 12 provided at a front end of the electric undercarriage 10, a lift mechanism unit 50 provided on the electric undercarriage 10 throughout a portion above the distance detection unit 12 to the rear, and a surveillance camera 60 provided at the leading end of the lift mechanism unit 50. The first embodiment describes that the mobile vehicle is an autonomous surveillance vehicle including the distance detection unit 12 and the surveillance camera 60.

More specifically, a Wi-Fi antenna 71 serving as a bidirectional communication antenna and a warning light 72 are mounted on the rear end of the electric undercarriage 10, and small CCD cameras 73 are buried in the left and right side faces and the rear end face of the electric undercarriage 10. A GPS antenna 74 is mounted at the leading end of the lift mechanism unit 50 at the back of the surveillance camera 60.

The lift mechanism unit 50, the surveillance camera 60, the GPS antenna 74, the Wi-Fi antenna 71, and the warning light 72 become protruding obstacles when the distance detection unit 12 measures (range-finds) the distance to an object present in a space in a traveling direction of the vehicle, and these components are sometimes referred to as "protruding structures" in the description below. Notably, the exterior of the electric undercarriage 10 does not have a protrusion that is to become an obstacle for the distance measurement with the distance detection unit 12.

The vehicle 1 is configured to preliminarily store map information and moving route information of a region where the vehicle 1 is to travel, and to travel on a predetermined route, while avoiding an obstacle, by utilizing information acquired from the surveillance camera 60, the distance detection unit 12, and the GPS (Global Positioning System).

In this case, the vehicle 1 recognizes a posture of a person issuing instruction by particularly utilizing the surveillance camera 60, the distance detection unit 12, or the like, and autonomously travels while recognizing the condition ahead of the electric undercarriage 10 in the traveling direction on the basis of the instruction previously associated with this posture. For example, when detecting that there is an obstacle or a step ahead, the vehicle 1 stops, turns, moves backward, or moves forward to change its course, and executes a function corresponding to the instruction, in order to prevent the collision against the obstacle.

Next, the configuration concerning the traveling of the mobile vehicle 1 will be described with reference to FIGS. 3(A) and 3(B). Note that a front wheel 21 and a rear wheel 22 on the right are indicated by a two-dot chain line in FIG. 3(A), and sprockets 21b, 22b, 31b, and 32b described below are indicated by a dotted line in FIG. 3(B).

<Description of Electric Undercarriage>

The electric undercarriage 10 includes an undercarriage body 11, four wheels mounted at the front part, the rear part, the left part, and the right part of the undercarriage body 11, two electric motors 41R and 41L that independently and rotationally drive a pair of left and right wheels at least on the front part or the rear part out of the four wheels, a battery 40 that supplies electric power to the two electric motors 41R and 41L, the distance detection unit 12, and a control unit not illustrated.

In the first embodiment, as illustrated in FIGS. 3(A) and 3(B), the left and right wheels at the side close to an arrow A are the front wheels 21 and 31, the remaining left and right wheels are rear wheels 22 and 32, and the left and right front wheels 21 and 31 are independently controlled to be driven by the two electric motors 41R and 41L, in order to move the electric undercarriage 10 forward in the direction of the arrow A.

FIGS. 3(A) and 3(B) are provided to only describe the components composing the electric undercarriage and the arrangement of these components. It is to be noted that the size, the space, and the like of each component of the electric undercarriage illustrated in FIGS. 3(A) and 3(B) do not always coincide with those of the electric undercarriage illustrated in FIGS. 1 and 2.

Bumpers 17f and 17r are mounted at a front surface 13 and a rear surface 14 of the undercarriage body 11, and sensors 18 having a function of a band-like side bumper are provided on a right side face 12R and a left side face 12L to extend in the front-back direction of the undercarriage body 11. Axles 21a and 31a and axles 22a and 32a that rotationally support the front wheels 21 and 31 and the rear wheels 22 and 32, respectively, are mounted below the sensors 18. The axles 21a and 31a of the front wheels 21 and 31 are disposed on the same first shaft center $P_1$, and the axles 22a and 32a of the rear wheels 22 and 32 are disposed on the same second shaft center $P_2$.

The axles 21a, 31a, 22a, and 32a can independently rotate, when they are not coupled to one another with a power transmission member.

A pair of front wheel 21 and rear wheel 22 on the right and a pair of front wheel 31 and rear wheel 32 on the left simultaneously operate by belts 23 and 33 serving as a power transmission member. Specifically, a pulley 21b is provided to the axle 21a of the front wheel 21 on the right, and a pulley 22b is provided to the axle 22a of the rear wheel 22. For example, the belt 23 provided with projections engaged with a plurality of grooves formed on the outer peripheral surfaces of the pulleys 21b and 22b is stretched between the pulley 21b of the front wheel 21 and the pulley 22b of the rear wheel 22. Similarly, a pulley 31b is provided to the axle 31a of the front wheel 31 on the left, a pulley 32b is provided to the axle 32a of the rear wheel 32, and the belt 33 having the similar structure to the belt 23 is stretched between the pulley 31b of the front wheel 31 and the pulley 32b of the rear wheel 32.

With this, the front wheel and the rear wheel on the right (21 and 22) and the front wheel and the rear wheel on the left (31 and 32) are interconnected and driven by the belt 23 and by the belt 33. Therefore, it is only necessary that one of the front and rear wheels is driven. The first embodiment describes that the front wheels 21 and 31 are driven. When one wheel is used as a drive wheel, the other wheel functions as a driven wheel (coupled driving wheel) driven by the belt, which is the power transmission member, without causing a slip.

As the power transmission member for interconnecting and driving the front wheel and the rear wheel, a sprocket and a chain engaged with the sprocket may be used, besides the pulley and the belt provided with the projections engaged with the pulley. If a slip is permitted, a pulley and a belt having large friction may be used as the power transmission member. However, the power transmission member has to be configured such that the rotating speed of the drive wheel and the rotating speed of the driven wheel become the same.

In FIGS. 3(A) and 3(B), the front wheels (21, 31) correspond to the drive wheels, and the rear wheels (22, 32) correspond to the driven wheels.

Two motors which are the electric motor 41R for driving the front wheel 21 and the rear wheel 22 on the right and the electric motor 41L for driving the front wheel 31 and the rear wheel 32 on the left are provided close to the front wheels on the bottom surface 15 of the undercarriage body 11. A gear box 43R is provided as a power transmission mechanism between a motor shaft 42R of the right electric motor 41R and the axle 21a of the right front wheel 21. Similarly, a gear box 43L is provided as a power transmission mechanism between a motor shaft 42L of the left electric motor 41L and the axle 31a of the left front wheel 31. In the present embodiment, the two electric motors 41R and 41L are disposed side by side so as to be symmetric with respect to a centerline CL of the undercarriage body 11 in the traveling direction (the direction of the arrow A), and the gear boxes 43R and 43L are mounted at the outside of the electric motors 41R and 41L in the horizontal direction.

Each of the gear boxes 43R and 43L is an assembly that includes a plurality of gears and shafts to transmit power from the corresponding electric motor to the corresponding axle serving as an output shaft by changing the torque, rotating speed, and rotation direction. Each of the gear boxes 43R and 43L may include a clutch that switches between power transmission and power shutoff. A pair of rear wheels 22 and 32 is pivotally supported respectively by bearings 44R and 44L which are respectively mounted to be close to the right side face 12R and the left side face 12L on the bottom surface 15 of the undercarriage body 11.

According to the above configuration, the front and rear wheels 21 and 22 on the right and the front and rear wheels 31 and 32 on the left in the traveling direction can be independently driven. That is, power from the right electric motor 41R is transmitted to the gear box 43R through the motor shaft 42R, and transmitted to the axle 21a with the rotating speed, torque, or rotation direction being changed by the gear box 43R. Then, the front wheel 21 rotates with the rotation of the axle 21a, and the rotation of the axle 21a is transmitted to the rear shaft 22b through the pulley 21b, the belt 23, and the pulley 22b to rotate the rear wheel 22. The power transmission from the left electric motor 41L to the front wheel 31 and the rear wheel 32 is similar to the power transmission for the right side described above.

The vehicle 1 moves forward or backward by setting the gear ratios (speed reduction ratios) of the gear boxes 43R and 43L to be the same, if the rotating speeds of the right electric motor 41R and the left electric motor 41L are the same. In order to change the speed of the vehicle 1, the gear ratios of the gear boxes 43R and 43L may be changed while keeping at the same value.

In order to change the traveling direction, the gear ratios of the gear boxes 43R and 43L are changed to cause a difference between the rotating speed of the front wheels 21 and the rear wheels 22 on the right and the rotating speed of the front wheel 31 and the rear wheel 32 on the left. Further, when the right wheels and the left wheels are rotated in the opposite directions at the same rotating speed by changing the rotating direction of the output from each of the gear boxes 43R and 43L, the vehicle 1 can perform a stationary turn around a center point CP of a rectangular area enclosed by centers $G_{21}$, $G_{31}$, $G_{22}$, and $G_{32}$ of four contact areas of a pair of front wheels 21 and 31 and a pair of rear wheels 22 and 32. In the first embodiment, the central part of the undercarriage body 11 substantially coincides with the center point CP.

The vehicle 1 is not provided with a steering mechanism for varying the angles of the front and rear wheels. Therefore, in order to turn the mobile vehicle 1 while stationary, resistance applied to the wheels is increased, as the space (wheel base) between the front and rear wheels is larger, and thus, large torque for the turn is needed. However, since the gear ratios of the gear boxes 43R and 43L are variable, large torque can be applied to the wheels only by decreasing the rotating speeds of the wheels during the turn.

For example, in the case where the number of teeth of the gear on the side of the motor shaft 42R is set to be 10, the number of teeth of an intermediate gear is set to be 20, and the number of teeth of the gear on the side of the axle 21b is set to be 40, as the gear ratio in the gear box 43R, four-fold torque can be obtained, although the rotating speed of the axle 21b becomes a fourth the rotating speed of the motor shaft 42R. Further, larger torque can be obtained by selecting the gear ratio by which the rotating speed is more decreased. Therefore, the vehicle 1 can turn on a road surface which applies large resistance to the wheels, such as an irregular ground or a sand place.

The wheels are not particularly limited. In the first embodiment, the front wheels 21 and 31 and the rear wheels 22 and 32 are the same. Specifically, as illustrated in FIG. 1, the front wheel 31 and the rear wheel 32 include wheel bodies 31Wa and 32Wa, and tires 31Wb and 32Wb which are mounted at the outer peripheral part of the wheel bodies 31Wa and 32Wa and filled with air. The front and rear wheels 21 and 22 on the right are similarly configured.

The mobile vehicle 1 includes the gear boxes 43R and 43L between the motor shafts 42R and 42L and the axles 21a and 31a, whereby vibration from the front wheels 21 and 31 is not directly transmitted to the motor shafts. In addition, it is desirable that a clutch which transmits or disconnects (shuts off) power is provided to the gear boxes 43R and 43L, and the power transmission between the electric motors 41R and 41L and the axles 21a and 31a serving as drive shafts is shut off, when electric power is not supplied to the electric motors 41R and 41L. According to this configuration, even if the wheels rotate while the vehicle 1 stops due to the application of force to the undercarriage body 11, the rotation is not transmitted to the electric motors 41R and 41L. Therefore, back electromotive force is not generated on the electric motors 41R and 41L, and therefore, there is no chance that the circuits of the electric motors 41R and 41L are damaged.

As described above, the four wheels are driven such that the front and rear wheels on each right and left side are coupled to each other with the power transmission member and can be driven by two electric motors mounted close to the front wheels. Thus, this configuration eliminates the need to provide electric motors exclusive to the rear wheels. In addition, this configuration eliminates the need to provide gear boxes which are exclusive to the rear wheels and required between the electric motor and the rear wheels. Accordingly, an installation space for the electric motors and the gear boxes exclusive to the rear wheels can be reduced.

As described above, the two electric motors 41R and 41L are provided close to the front wheels 21 and 31 on the bottom surface 15 of the undercarriage body 11 on the right and left in the traveling direction, and the gear boxes 43R and 43L are mounted on the right of the electric motor 41R and on the left of the electric motor 41L. On the other hand, only the bearings 44R and 44L are mounted close to the rear wheels 22 and 32 on the bottom surface 15. Therefore, a wide storage space 16 can be ensured on the bottom surface 15 of the undercarriage body 11 throughout from the center thereof to the rear end of the vehicle body.

A battery (rechargeable battery) 40 such as a lithium ion battery is used as a power source for each of the electric motors 41R and 41L. The battery 40 is stored in the storage space 16. Specifically, the battery 40 has an outer shape of a rectangular solid, and can be placed at substantially the center of the bottom surface 15 as illustrated in FIG. 3(B). The rear surface 14 of the undercarriage body 11 is desirably configured to be openable with respect to the top surface or the bottom surface 15 to facilitate the insertion and removal of the battery 40 into and from the storage space 16. According to this, a large-capacity battery 40 for implementing long-time traveling can be placed in the storage space 16 of the undercarriage body 11. In addition, the operation of exchanging, charging, or inspecting the battery 40 can easily be performed from the rear surface 14. Further, the battery 40 can be placed on the bottom surface 15, whereby an electric vehicle having low center of gravity of the undercarriage body 11 and capable of stably traveling can be obtained.

<Description of Distance Detection Unit>

FIG. 4 is a schematic explanatory diagram when a laser irradiation region of the distance detection unit in the mobile vehicle according to the first embodiment is viewed from top.

The distance detection unit 12 has a function of confirming a moving region ahead or the condition of the road surface, and includes a light-emitting unit that emits light, a light-receiving unit that receives light, and a scanning control unit that scans the emission direction of light in order that the light is emitted to a plurality of predetermined measured points in the space ahead.

Examples of usable emitted lights include laser, an infrared ray, visible light, an ultrasonic wave, and an electromagnetic wave. Laser is preferably used from the viewpoint that the distance measurement has to be satisfactorily implemented even at night.

LIDAR (Light Detection and Ranging or Laser Imaging Detection and Ranging) that measures distances at a plurality of measured points in a predetermined distance measurement region by emitting laser to a two-dimensional space or a three-dimensional space in the distance measurement region can be employed for the distance detection unit 12.

The LIDAR emits laser from the light-emitting unit, detects reflection light reflected on an object by the light-receiving unit, and calculates a light-receiving distance from the time difference between the emission time and the light-receiving time.

The scanning control unit scans the emission direction of light in order that light is emitted to the plurality of predetermined measured points in the space ahead in the traveling direction. The scanning control unit changes the emission direction of laser little by little at regular time intervals.

The LIDAR changes the emission direction of laser at every predetermined scanning pitch within the range of a predetermined two-dimensional space in the horizontal direction, thereby calculating the distance to the object (two-dimensional scanning in the horizontal direction). In order to three-dimensionally calculate a distance, the LIDAR changes the emission direction of laser at every predetermined scanning pitch in the vertical direction, as well as performs the above-mentioned two-dimensional scanning in the horizontal direction, thereby calculating the distance.

For example, when the emission direction of laser emitted from the light-emitting unit of the distance detection unit 12 is changed to move to the right by a predetermined scanning pitch in the horizontal direction, the laser impinges on a vertical plane at the adjacent position (measured point: the position irradiated with the laser) shifted to the right in the horizontal direction by the scanning pitch.

If an object is present at the position of the vertical plane, a part of the reflection light of the laser reflected at each measured point is received by the light-receiving unit.

When the emission direction of the laser is shifted in the horizontal direction by a predetermined scanning pitch as described above, the predetermined number of measured points is irradiated with the laser. In this way, whether the reflection light is received or not is confirmed for each of the plurality of measured points to calculate a light-receiving distance L0.

When the light (laser) emitted toward the plurality of measured points is reflected by an object, it is confirmed that the reflection light reflected by the object is received by the light-receiving unit, and it is determined that a part of the object is present at the position of the measured point where the distance is detected.

When the laser is incident on the light-receiving unit of the distance detection unit 12, an electric signal according to the light-receiving intensity of the laser is output.

The electric undercarriage 10 includes a control unit 10C that receives the electric signal from the distance detection unit 12.

The control unit 10C confirms the electric signal output from the light-receiving unit. For example, in the case where the electric signal having intensity higher than or equal to a predetermined threshold is detected, the control unit 10C determines that the laser is received.

Notably, a laser emitting element conventionally used is used for the light-emitting unit, and a laser receiving element that detects laser is used for the light-receiving unit.

The control unit 10C also calculates the light-receiving distance L0, which is the distance between the light-emitting unit and the plurality of measured points, by utilizing the time difference between the emission time at which the laser is emitted from the light-emitting unit and the light-receiving time at which it is confirmed that the reflection light is received by the light-receiving unit.

For example, the control unit 10C acquires a current time using a timer, calculates the time difference between the laser emission time and the light-receiving time at which it is confirmed that the laser is received, and calculates the light-receiving distance L0 by utilizing the time difference between both times and the speed of the laser.

In the case where the two-dimensional scanning in the horizontal direction is performed by the distance detection unit 12, laser is emitted in the range with a predetermined center angle θ around the electric undercarriage 10. At that time, the region up to the longest light-receiving distance L0 in which the laser emitted from the laser emission center point P of the distance detection unit 12 impinges and is reflected on an object and received by the light-receiving unit is defined as a distance measurement region.

In the first embodiment, the predetermined center angle θ ranges from 180° to 330° (specifically, 270°), and the longest light-receiving distance L0 ranges from 25 m to 30 m, for example.

<Description of Protruding Structure>

Figure 5:
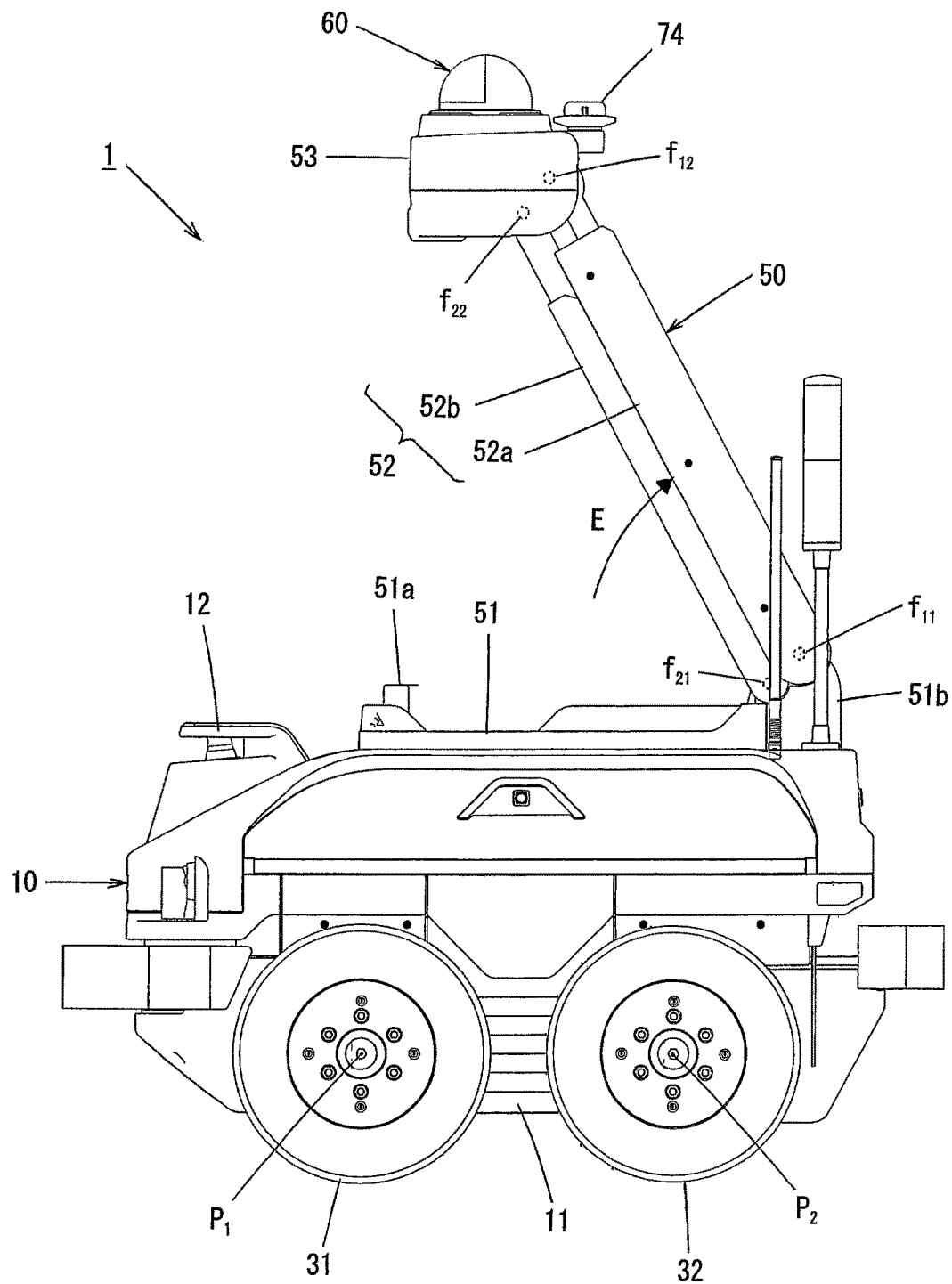
FIG. 5 is a left side view illustrating a state in which an imaging unit in the mobile vehicle according to the first embodiment is raised.
Figure 6:
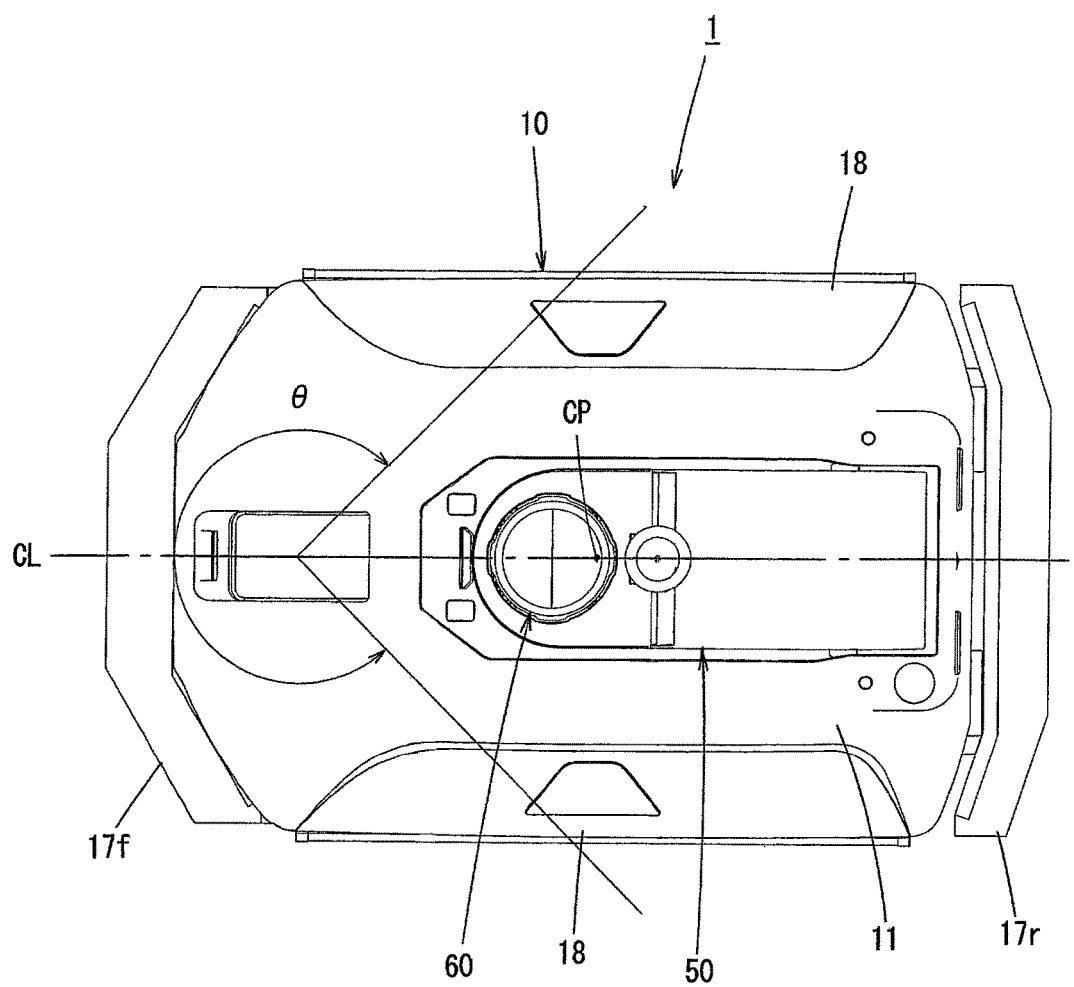
FIG. 6 is a plan view illustrating the state in which the imaging unit in the mobile vehicle according to the first embodiment is raised.

FIG. 5 is a left side view illustrating a state in which an imaging unit in the mobile vehicle according to the first embodiment ascends, and FIG. 6 is a plan view illustrating the state illustrated in FIG. 5 in which the imaging unit in the mobile vehicle ascends.

As illustrated in FIGS. 1, 2, 5, and 6, the lift mechanism unit 50 is configured to move the surveillance camera 60 serving as the imaging unit in the vertical direction and in the front-back direction with respect to the electric undercarriage 10 in the first embodiment.

More specifically described, a link mechanism, specifically a parallel link mechanism, having a boom 52 that swings in the vertical direction and in the front-back direction is used as the lift mechanism unit 50.

That is, the lift mechanism unit 50 includes an underframe 51 fixed on the undercarriage body 11 to extend in the front-back direction, the boom 52 that is mounted at the rear end of the underframe 51 so as to be swingable around left and right shaft centers, a balance unit 53 provided at the leading end of the boom 52, and an unillustrated telescopic cylinder that is provided in the underframe 51 to vertically swing the boom 52.

The underframe 51 includes a support unit 51a that is provided on the front end for supporting the descending boom 52, and a pivot unit 51b that is provided at the rear end to pivotally support the base end of the boom 52.

The boom 52 has a main frame 52a and a balance unit support rod 52b provided along the main frame 52a.

The base end of the main frame 52a is fixed to a first base end shaft $f_{11}$ pivotally mounted to the pivot unit 51b of the underframe 51 so as to be rotatable, and the leading end of the main frame 52a is pivotally mounted to the balance unit 53 through a first leading end shaft $f_{12}$.

The base end of the balance unit support rod 52b is fixed to a second base end shaft $f_{21}$ pivotally mounted to the pivot unit 51b of the underframe 51, and the leading end of the balance unit support rod 52b is pivotally mounted to the balance unit 53 through a second leading end shaft $f_{22}$.

An electric cylinder, a hydraulic cylinder, or a pneumatic cylinder can be used as the unillustrated telescopic cylinder.

The base end of the telescopic cylinder is pivotally mounted to the underframe 51 or the undercarriage body 11 so as to be swingable in the vertical direction, and the leading end of the telescopic cylinder is coupled to the first base end shaft $f_{11}$ through an arm not illustrated. In this case, the leading end of the telescopic cylinder is pivotally mounted to one end of the arm, and the other end of the arm is fixed to the first base end shaft $f_{11}$.

The balance unit 53 is a balancing device that stably keeps normal attitudes of the surveillance camera 60 and the GPS antenna 74, even if the boom 52 swings in the vertical direction.

The surveillance camera 60 mainly photographs an image of a space ahead of the vehicle in the traveling direction, and an image to be photographed may be a still image or a moving image. The photographed image is stored in a storage unit provided in the electric undercarriage 10 as input image data, and transferred to a management server through a network as necessary.

The surveillance camera 60 is not particularly limited. For example, a doom camera (pan-tilt-zoom (PTZ) camera or the like), a box camera, a housing camera, an infrared night vision camera, a telecamera, or the like can be used for the surveillance camera 60. The surveillance camera 60 is placed on the balance unit 53 such that space regions ahead and on the right and left of the electric undercarriage 10 can be photographed. When the vehicle 1 is used outdoors, a waterproof function is added to the surveillance camera 60.

Further, as a doom camera, the one of a type having a wide angle of view of a lens in the horizontal and vertical directions (e.g., about 180° in the horizontal direction, and about 90° in the vertical direction), the one of a high-resolution type (e.g., 3840×2160 pixels), the one of a type that enables color photographing, the one of a type that performs photographing only when detecting a person, the one of a type that detects a person and tracks the person by zooming in on his/her face, and an infrared night vision camera that can photograph in darkness may be used.

Next, the operation of the lift mechanism unit 50 will be described.

FIGS. 1 and 2 illustrate the state in which the lift mechanism unit 50 descends, and at that time, the telescopic cylinder extends. To lift the lift mechanism unit 50, the telescopic cylinder is contracted. According to this, the arm pivotally mounted to the leading end of the telescopic cylinder is pulled forward, and the arm, the first base end shaft $f_{11}$, and the main frame 52a integrally swing upward (in the direction of an arrow E). Further, since the main frame 52a swings upward, the balance unit support rod 52b coupled to the leading end of the main frame 52a through the balance unit 53 is lifted up (in the direction of the arrow E).

In this case, the second leading end shaft $f_{22}$ of the balance unit 53 is drawn toward the balance unit support rod 52b due to the parallel positional deviation of the balance unit support rod 52b with respect to the main frame 52a. Thus, the normal attitudes of the balance unit 53, and the surveillance camera 60 and the GPS antenna 74 placed on the balance unit 53 are maintained from the descending position to the ascending position.

When the telescopic cylinder is extended, the boom 52 performs the operation reverse to the above operation, so that it is in the descending state illustrated in FIG. 1 from the ascending state illustrated in FIG. 4.

As illustrated in FIGS. 2, 4, and 6, the protruding structures including the lift mechanism unit 50, the surveillance camera 60, the GPS antenna 74, the Wi-Fi antenna 71, and the warning light 72 are placed at positions outside the range of the predetermined center angle θ on the electric undercarriage 10. That is, they are located in a blind spot at the rear of the distance detection unit 12 on the electric undercarriage 10.

Consequently, there are no protruding structures, which hinder the scanning of the distance detection unit 12, within the range of the predetermined center angle θ around the mobile vehicle 1, whereby the vehicle 1 can reliably recognize an obstacle ahead of the vehicle 1 and on the left and right of the vehicle 1.

Further, a pantograph mechanism is preferable for the lift mechanism unit 50, because the pantograph mechanism can be placed on the electric undercarriage 10 in a narrow range (the range of the center angle of 0° to 10°) that is not horizontally scanned by the distance detection unit 12, and can lift the surveillance camera 60 and the GPS antenna 74 to a high position (for example, the height difference of 70 cm or more). In addition, while the balance unit 53 of the lift mechanism unit 50 is placed within the range of the predetermined center angle θ in order to place the surveillance camera 60 at the front as much as possible, the balance unit 53 can be placed at the position just above the distance detection unit 12 where the balance unit 53 does not interfere with the scanning of the distance detection unit 12, when the pantograph mechanism is used.

Second Embodiment

The first embodiment described with reference to FIG. 2 describes that the GPS antenna 74 is placed on the lift mechanism unit 50. However, the GPS antenna 74 may be placed on the electric undercarriage 10 at a position that is outside the range of the predetermined center angle θ and that does not interfere with the lift mechanism unit 50.

For example, in FIG. 2, the warning light 72 is provided at the rear of the left Wi-Fi antenna 71. On the other hand, a free space is present at the rear of the right Wi-Fi antenna 71. Therefore, the GPS antenna 74 may be mounted to a pole erected on this free space.

With this configuration, the GPS antenna 74 can always receive a signal of current position information from a satellite at a high position with high sensitivity.

Third Embodiment

The first embodiment describes that a parallel link mechanism that lifts and lowers one boom is used as the lift mechanism unit 50. However, a single arm pantograph mechanism having two booms which are upper and lower booms or a crossed arm pantograph mechanism may be used.

In these cases as well, the lift mechanism unit is provided at the position outside the range of the predetermined center angle θ.

Other Embodiments

In the mobile vehicles according to the first to third embodiments, the lift mechanism may be eliminated, and the surveillance camera 60 may be provided on the undercarriage body 11 directly or through an installation base. Alternatively, the surveillance camera 60 may be mounted just above the distance detection unit 12 through an installation base.

The embodiments of the present invention described above should be considered in all respects as illustrative and not restrictive of the present invention. The scope of the present invention is not limited to the above description, but the accompanying claims and their equivalents are intended to cover such forms or modifications as would fall within the scope and spirit of the invention.

What is claimed is:

1. A mobile vehicle comprising:
   an electric undercarriage including a wheel that travels; and a distance detection unit and a protruding structure which are mounted on the electric undercarriage, wherein
   the distance detection unit is configured to emit light horizontally in a range of a predetermined center angle around the electric undercarriage and detect a distance to an object present within the range of the predetermined center angle,
   the protruding structure includes an antenna, a warning light, an imaging device, and a lift mechanism unit, and
   the protruding structure is placed on the electric undercarriage at a position outside the range of the predetermined center angle.

2. The mobile vehicle according to claim 1, wherein the predetermined center angle ranges from 180° to 330° from front to left and right sides of the electric undercarriage.

3. The mobile vehicle according to claim 1, wherein the distance detection unit employs LIDAR that emits laser to at least a two-dimensional space in a predetermined distance measurement region to detect distances at a plurality of measured points within the range of the predetermined center angle.

4. The mobile vehicle according to claim 1, further comprising:
   the antenna and the lift mechanism unit as the protruding structure, wherein
   the antenna includes a GPS antenna,
   the GPS antenna being mounted on the lift mechanism unit so as to be raised or lowered.

5. The mobile vehicle according to claim 1, further comprising:
   the imaging device as the protruding structure, wherein
   the imaging device includes a surveillance camera,
   the surveillance camera being mounted on the lift mechanism unit so as to be raised or lowered.

6. The mobile vehicle according to claim 1, further comprising:
   the imaging device as the protruding structure, wherein
   the imaging device includes a small camera,
   the small camera being mounted at a rear end of the electric undercarriage.

7. The mobile vehicle according to claim 1, further comprising:
   the antenna as the protruding structure, wherein
   the antenna includes a communication antenna.

8. The mobile vehicle according to claim 1, wherein the mobile vehicle is an autonomous mobile vehicle.

* * * * *